United States Patent [19]
Yamamoto et al.

[11] Patent Number: 5,619,678
[45] Date of Patent: Apr. 8, 1997

[54] ELECTRONIC DEVICE FOR CORRECTION OF ROM DATA WITH A PARAMETER FOR CALCULATION OF POSITION OF CORRECTION DATA

[75] Inventors: Iwao Yamamoto, Tokyo; Sunao Furui, Kanagawa, both of Japan

[73] Assignee: Sony Corporation, Tokyo, Japan

[21] Appl. No.: 122,904

[22] Filed: Sep. 16, 1993

[30]     Foreign Application Priority Data

Sep. 19, 1992   [JP]   Japan .................................. 4-274943

[51] Int. Cl.⁶ .............................. G06F 9/42; G06F 12/06
[52] U.S. Cl. ............... 395/492; 395/421.03; 395/421.11
[58] Field of Search ............................ 395/425 MS, 411, 395/430, 442; 365/174

[56]                 References Cited

U.S. PATENT DOCUMENTS

| | | | |
|---|---|---|---|
| 4,028,678 | 6/1977 | Moran | 340/172.5 |
| 4,028,679 | 6/1977 | Divine | 340/172.5 |
| 4,028,683 | 6/1977 | Divine et al. | 340/172.5 |
| 4,028,684 | 6/1977 | Divine et al. | 340/172.5 |
| 4,051,460 | 9/1977 | Yamada et al. | 364/900 |
| 4,095,278 | 6/1978 | Kihara | 364/900 |
| 4,150,428 | 4/1979 | Inrig et al. | 364/200 |

(List continued on next page.)

FOREIGN PATENT DOCUMENTS

| | | |
|---|---|---|
| 0263447A2 | 4/1988 | European Pat. Off. . |
| 0428005A2 | 5/1991 | European Pat. Off. . |
| 0458559A2 | 11/1991 | European Pat. Off. . |
| 57-211651 | 12/1982 | Japan . |
| 58-016350 | 4/1983 | Japan . |
| 62-249231 | 10/1987 | Japan . |
| 1-286029 | 5/1988 | Japan . |
| 1-065633 | 3/1989 | Japan . |
| 1-099129 | 4/1989 | Japan . |
| 1-114941 | 5/1989 | Japan . |

OTHER PUBLICATIONS

IBM, TDB, "Short and Long ROS Patch", vol. 24, #3, Aug. 1981, pp. 1379–1382.
IBM Technical Disclosure Bulletin, vol. 30, No. 5, Oct. 1987, "On–Site ROS Patch Mechanism", 2 pages.
IBM Technical Disclosure Bulletin, vol. 31, No. 1, Jun. 1988, "Dual Indirect RAM/ROM Jump Tables for Firmware Updates", pp. 294–298.
Melear, Charlie, "Applications for Microcomputers with E2PROM", Electro/86 and Mini/Micro Northeast 11 (1986), Conference Record, Los Angeles, CA, pp. 1–9.
IBM Technical Disclosure Bulletin, "Patch Microcode Change Level Check", L. Weiss, vol. 26, No. 10B, Mar. 1984, New York, NY, pp. 5606–5607.
SN 08/404115, Shimada et al., Priority date Jan. 13, 1992, effective filing date Jan. 6, 1993.
SN 08/469498, Yamamoto et al., Priority date Jan. 29, 1992, effective filing date Jan. 15, 1993.
SN 08/368758, Shimada et al., priority date May 23, 1991, effective filing date May 13, 1992.
SN. 08/110818 now FWC 08/650212, Yamamoto et al. Priority date Sep. 19, 1992, effective filing date Aug. 23, 1993.

*Primary Examiner*—Reba I. Elmore
*Attorney, Agent, or Firm*—Limbach & Limbach LLP

[57]                 ABSTRACT

An electronic device having an integrated structure including central processing means for performing an access control to storage means, a calculation processing, etc., fixed storage means, input means for inputting correction information for correcting information of a specific part stored in the fixed storage means, correction information storage means for storing the correction information input from the input means, and change-over means for switching the access by the central processing means from an area in which a specific part of the information in the fixed storage means is stored, from the fixed storage means to the correction information storage means. The correction information includes at least batch correction data for correcting the information of the specific part and a parameter for calculating a storage position of the batch correction data in the correction information storage means.

7 Claims, 6 Drawing Sheets

U.S. PATENT DOCUMENTS

| | | | |
|---|---|---|---|
| 4,218,757 | 8/1980 | Drogichen | 364/900 |
| 4,291,375 | 9/1981 | Wolf | 364/483 |
| 4,296,470 | 10/1981 | Fairchild et al. | 364/200 |
| 4,319,343 | 3/1982 | Powell | 365/189 |
| 4,400,798 | 8/1983 | Francis et al. | 365/174 |
| 4,424,574 | 1/1984 | Enoki et al. | 364/900 |
| 4,456,966 | 6/1984 | Bringol et al. | 364/900 |
| 4,490,783 | 12/1984 | McDonough et al. | 364/200 |
| 4,490,812 | 12/1984 | Guterman | 364/900 |
| 4,542,453 | 9/1985 | Patrick et al. | 364/200 |
| 4,571,677 | 2/1986 | Hirayama et al. | 364/200 |
| 4,610,000 | 9/1986 | Lee | 365/189 |
| 4,620,273 | 10/1986 | Mitani et al. | 364/136 |
| 4,727,476 | 2/1988 | Rouchon | 364/200 |
| 4,745,572 | 5/1988 | Wilburn | 364/900 |
| 4,751,703 | 6/1988 | Picon et al. | 371/10 |
| 4,769,767 | 8/1988 | Hilbrink | 365/174 |
| 4,802,119 | 1/1989 | Heene et al. | 364/900 |
| 4,819,154 | 4/1989 | Stiffler et al. | 364/200 |
| 4,831,517 | 5/1989 | Crouse et al. | 364/200 |
| 4,905,200 | 2/1990 | Pidsosny et al. | 364/300 |
| 4,942,541 | 7/1990 | Hoel et al. | 364/519 |
| 4,972,481 | 11/1990 | Santesson | 380/49 |
| 5,051,897 | 9/1991 | Yamaguchi et al. | 364/200 |
| 5,063,499 | 11/1991 | Garber | 395/500 |
| 5,077,737 | 12/1991 | Leger et al. | 371/10.1 |
| 5,199,032 | 3/1993 | Sparks et al. | 371/3 |
| 5,214,771 | 5/1993 | Clara et al. | 395/500 |
| 5,289,416 | 2/1994 | Iwai et al. | 365/200 |
| 5,305,460 | 4/1994 | Kaneko et al. | 395/775 |
| 5,357,627 | 10/1994 | Miyazawa et al. | 395/575 |
| 5,408,672 | 4/1995 | Miyazawa | 395/425 |
| 5,454,100 | 9/1995 | Sagane | 395/182.06 |

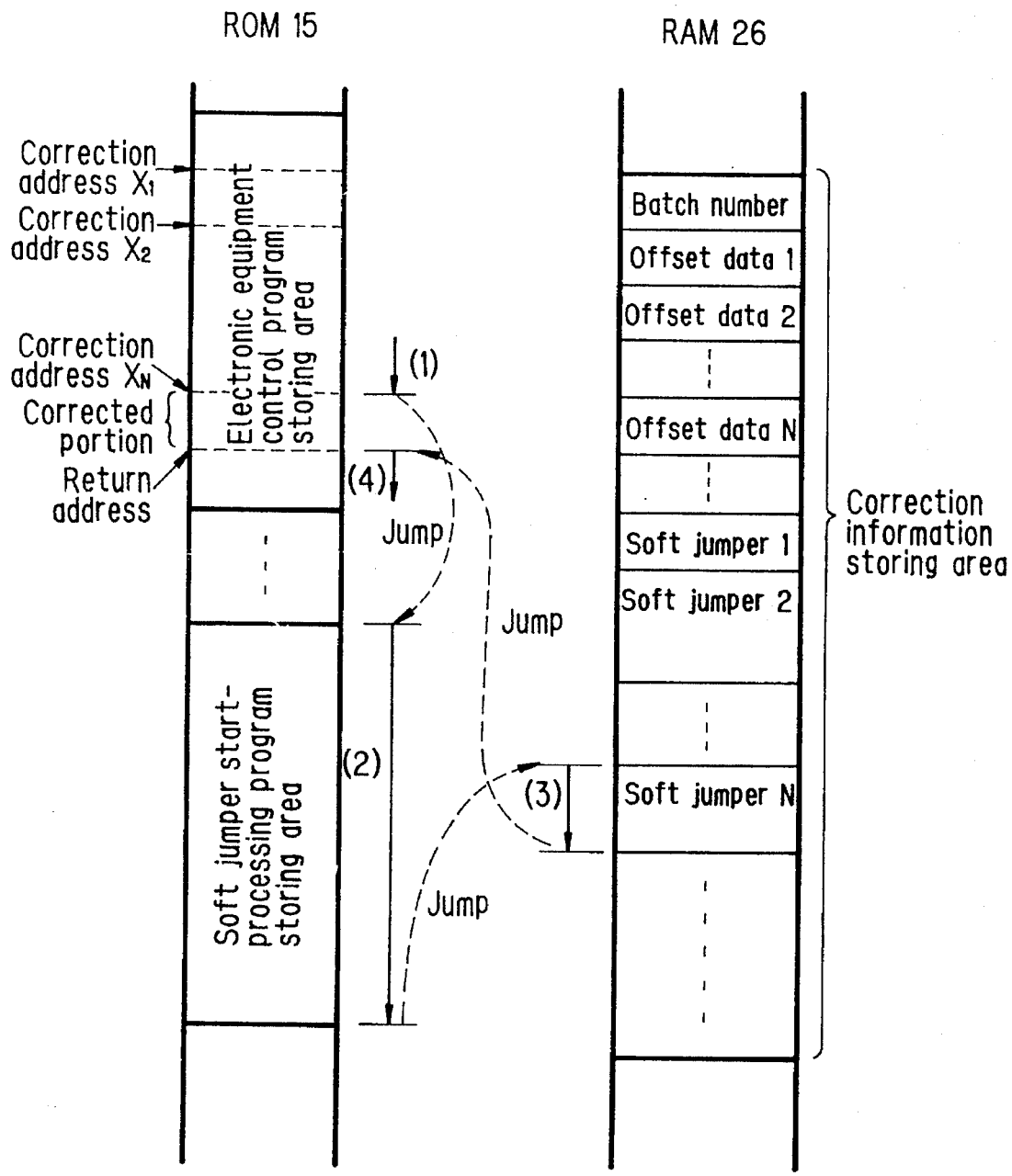

ELECTRONIC DEVICE FOR CORRECTION OF ROM DATA WITH A PARAMETER FOR CALCULATION OF POSITION OF CORRECTION DATA

BACKGROUND OF THE INVENTION

1. Field of the Invention

This invention relates to an electronic device such as a one-chip microcomputer for controlling an electronic equipment, which is suitable installation in the electronic equipment.

2. Description of the Related Art

In an electronic equipment, such as a commercially-used video tape recorder (VTR) integral with a camera (hereinafter referred to as "camera-integrated VTR"), a compact video deck or the like, a one-chip microcomputer has an integrated structure including a central processing unit (CPU) for performing access control for a storage means and calculation processing. The one-chip microcomputer further includes a storage means, such as a read only memory (ROM), for fixedly storing information. The one-chip microcomputer further includes a random access memory (RAM) through which performing information write-in and read-out operations can be carried out. The one-chip microcomputer further includes a peripheral circuit such as an input/out port, etc. This one-chip microcomputer has been conventionally used in a state where it is installed in the main body of the electronic equipment as described above.

Such one-chip integrated electronic devices have the potential to be low in cost due to mass production thereof. In addition, the amount of programs which can be stored in a ROM have been remarkably increased, particularly owing to the recent development of a semiconductor integration technique, so that various kinds of complicated control contents can be performed in accordance with the programs stored in the ROM.

As described above, various kinds of complicated controls can be performed in recently-developed electronic equipment by storing a large amount of programs into a ROM. However, the increased amount of programs stored into the ROM increases the chances of inducing a bug in the ROM. Particularly in the case where a bug is found after products have been mass-produced, the following countermeasures have been conventionally adopted. That is, those microcomputers which are mass-produced so that the bug is corrected are exchanged for those microcomputers having the bug which have been installed in electronic equipments. Alternatively, external parts for correcting the bug are newly equipped to electronic equipments having the bug. However, such countermeasures have caused the cost of the products to be increased. Further, an electronic equipment such as a camera-integrated VTR which has high packaging density of parts has a problem that the countermeasure of newly equipping an external part is very difficult.

SUMMARY OF THE INVENTION

An object of this invention is to provide an electronic device such as a one-chip microcomputer whose architecture is designed to deal with mass-production bugs, and which can automatically avoid a bug by supplying correction information from an external source only once without exchanging an internal part or adding a new external part even if the bug is not discovered until after mass-production has taken place.

In order to attain the above object, the electronic device according to this invention has an integrated structure comprising central processing means for performing an access control to a storage means and calculation processing. The central processing means may additionally perform other functions. The electronic device further includes fixed storage means. The electronic device further includes input means for inputting correction information for correcting a specific part of the information stored in the fixed storage means. The electronic device further includes correction information storage means for storing the correction information input from the input means. The electronic device further includes change-over means for switching the access by the central processing means from an area in which the specific part of the information to be corrected in the fixed storage means is stored, from the fixed storage means to the correction information storage means. The correction information includes at least batch correction data for correcting the specific part of the information and a parameter for calculating a storage position of the batch correction data in the correction information storage means.

The operation of calculating the storage position of the batch correction data in the correction information storage means is preferably carried out simultaneously with the storage of the correction information in the correction information storage means.

A table call command is used as an instruction for starting the switching of the access by the central processing means from the fixed storage means the correction information storage means. Returning the access by the central processing means from the correction information storage means to the fixed storage means is executed with a jump command.

As described above, according to the electronic device of this invention, the access of the central processing means is returned from the correction information storage means to the fixed storage means by the jump command. Therefore, there is newly provided means for deleting or scrapping the return address data before the returning access from the correction information storage means to the fixed storage means by the jump command. The return address data can be stored in a stack at the time when the table call command occurs and becomes unnecessary through the above returning operation.

Further, immediately when the table call command occurs, desired values of a register and program status words in the electronic device are preserved (stored), and these preserved values are returned just before the batch correction is started.

As described above, since the storage position of the batch correction data in the correction information storage means is calculated on the basis of the parameter existing in the correction information, it is not required to fix the storage position of the batch correction data in the correction information storage means. The individual batch correction data can be closely stored from its top into the batch correction data storage area in the correction information storage means, so that the storage area can be greatly saved.

Further, when the correction information is stored into the correction information storage means, the storage position of the batch correction data in the correction information storage means is calculated, so that it is unnecessary to calculate, one by one, the storage position of a batch correction data which is to be executed when the individual batch correction is executed. Thus, the batch correction program becomes simpler.

The switching operation of the access to the correction information storage means for batch correction is started based on the occurrence of the table call command, and the returning operation to the fixed storage means is executed by the jump command. Therefore, any size batch correction program can be used, and high correction performance can be provided for any bug in the fixed storage means.

The unnecessary return address stored in the stack at the time when the table call command occurs is deleted (scrapped) during the correcting operation, so that it is not accumulated in the stack and data other than the data in the stack area is not damaged. Further, the value of the register and the value of the program status word are immediately preserved. These values are returned just before the batch correction is started, so that the electronic device of this invention is controlled to start the batch correction immediately at the occurrence time of the table call command irrespective of variations of the internal status of the electronic device during a period from the occurrence of the table call command until the start of the batch correction.

BRIEF DESCRIPTION OF THE DRAWINGS

FIG. 6 is a schematic diagram showing a flow on an address map in the embodiment.

DETAILED DESCRIPTION OF PREFERRED EMBODIMENTS

A preferred embodiment according to this invention will be hereunder described with reference to the accompanying drawings.

Figure 1:
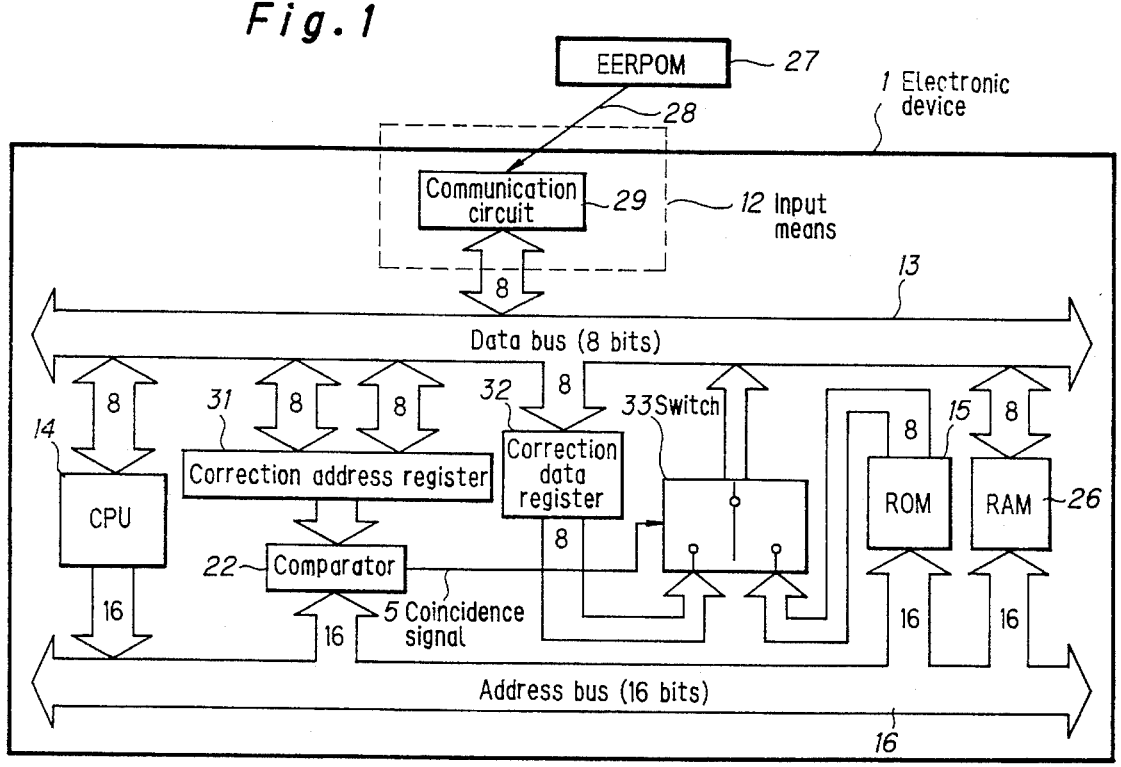
FIG. 1 is a block diagram showing the fundamental construction of an embodiment according to this invention.

FIG. 1 is a block diagram showing the fundamental construction of an embodiment according to this invention.

An electronic device 1 according to this invention as shown in FIG. 1 is designed with a structure, similar to a conventional one-chip microcomputer, including a CPU 14, a RAM 26, a ROM 15, a data bus 13, an address bus 16, etc. The electronic device 1 also includes a correction address register 31, a correction data register 32, a comparator 22, a switch 33 and an input means 12 therein.

An EEPROM 27 serving as an external storage unit is further equipped to the outside of the electronic device 1.

In the case of conducting a bug-corrected electronic equipment control using this electronic control device 1, information which is required to correct a bug occurring in the ROM 15 is stored beforehand into the EEPROM 27 in accordance with the content of part of the information containing the bug.

Here, the information for correcting the bug will be described. The correction information comprises a top address of the part to be altered due to existence of a bug in a program of the ROM 15 (hereinafter referred to as "correction address"). The correction information further includes a bug correction program(s), which is to executed in place of the program of the part to be altered in the ROM 15. The bug correction programs are sometimes hereinafter referred to as "soft jumper". A soft jumper for each bug is prepared in correspondence with the individual bugs existing in the ROM 15. The batch correction of this invention is carried out by a so-called batch correction that the part information of the ROM 15 which contains the bug is not executed, and is replaced by the corresponding soft jumper. The correction information further includes an address on the ROM 15 to which the program will be returned after the bug-corrected program is terminated, that is, an address just subsequent to the part on the ROM 15 which contains the bug.

Figure 2A:
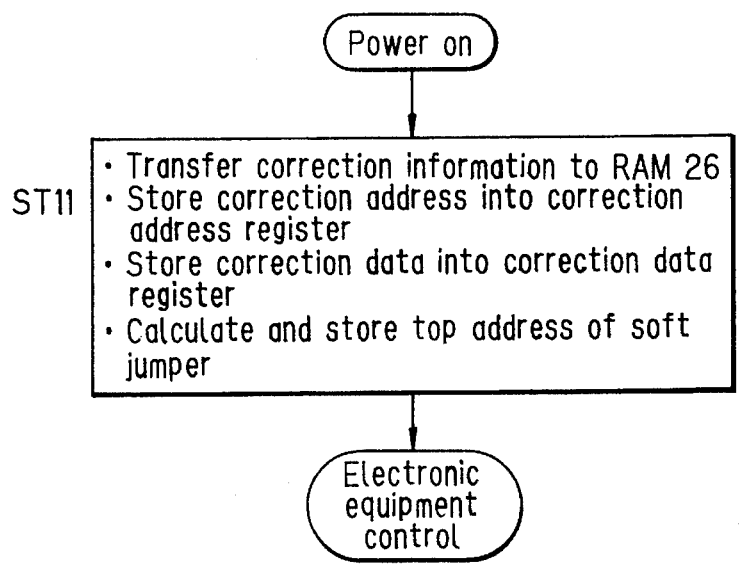
FIG. 2(a) is a flowchart showing a part of the operation of the embodiment.
Figure 2B:
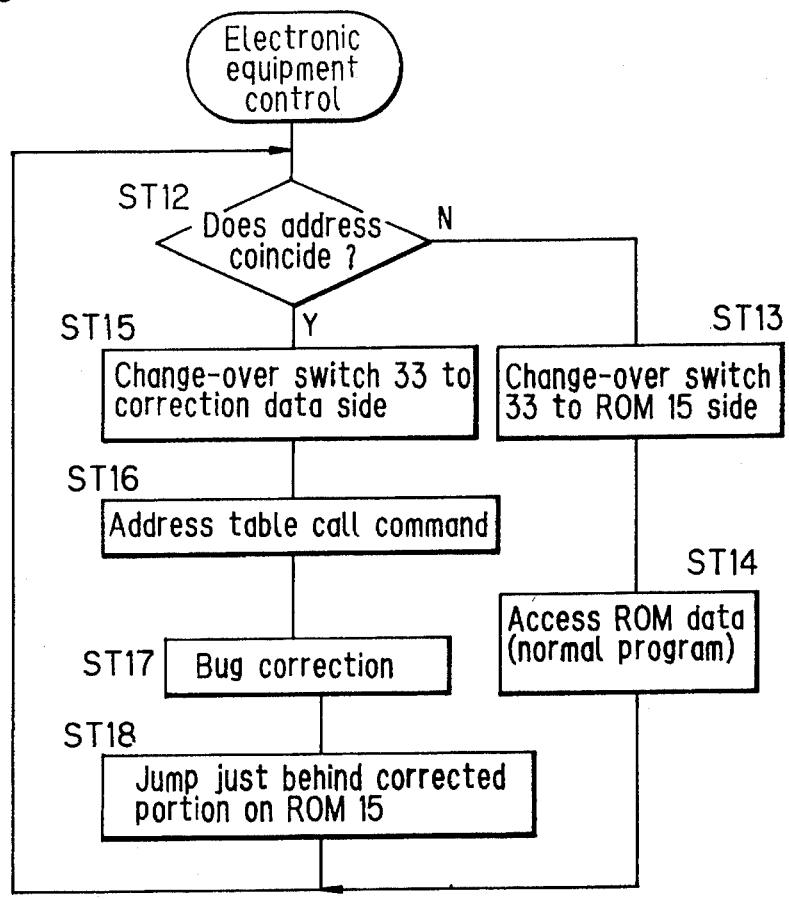
FIG. 2(b) is a flowchart showing another subsequent part of the operation of the embodiment.

Next, the operational flow when the electronic equipment is controlled using the electronic device 1 will be described with reference to the flowcharts as shown in FIGS. 2(a) and 2(b).

Upon switching a power source on to start the electronic device 1, execution of program for reading the correction information stored in the EEPROM 27 into the electronic device 1 through the input means 12 starts. This program transfers the correction information to the RAM 26. This program also stores the correction address to the correction address register. This program also stores the correction data to the correction data register. This program also calculates the top address of the soft jumper and stores the calculated top address into the RAM 26. (See ST11 of FIG. 2(a).)

Here, the structure of the correction information which is transferred from the EEPROM 27 to the RAM 26 will be described in detail with reference to FIG. 3.

The correction information comprises soft jumpers, each of which is designed to deal with each individual bug occurring in the ROM 15. The soft jumpers 1, 2, ... are closely stored in this order from the top thereof in the correction information storage area of the EEPROM 27 as shown in FIG. 3. With such a storage format (structure), the EEPROM 27 and the batch data storage area of the RAM 26 which is a transfer destination can be greatly saved.

In this storage format the top address of each soft jumper is varied in accordance with the length of a prior soft jumper, and this it will not be a fixed value. Therefore, the method of the present invention utilizes offset data are contained in the correction information to calculate the top address of each jumper.

Figure 3:
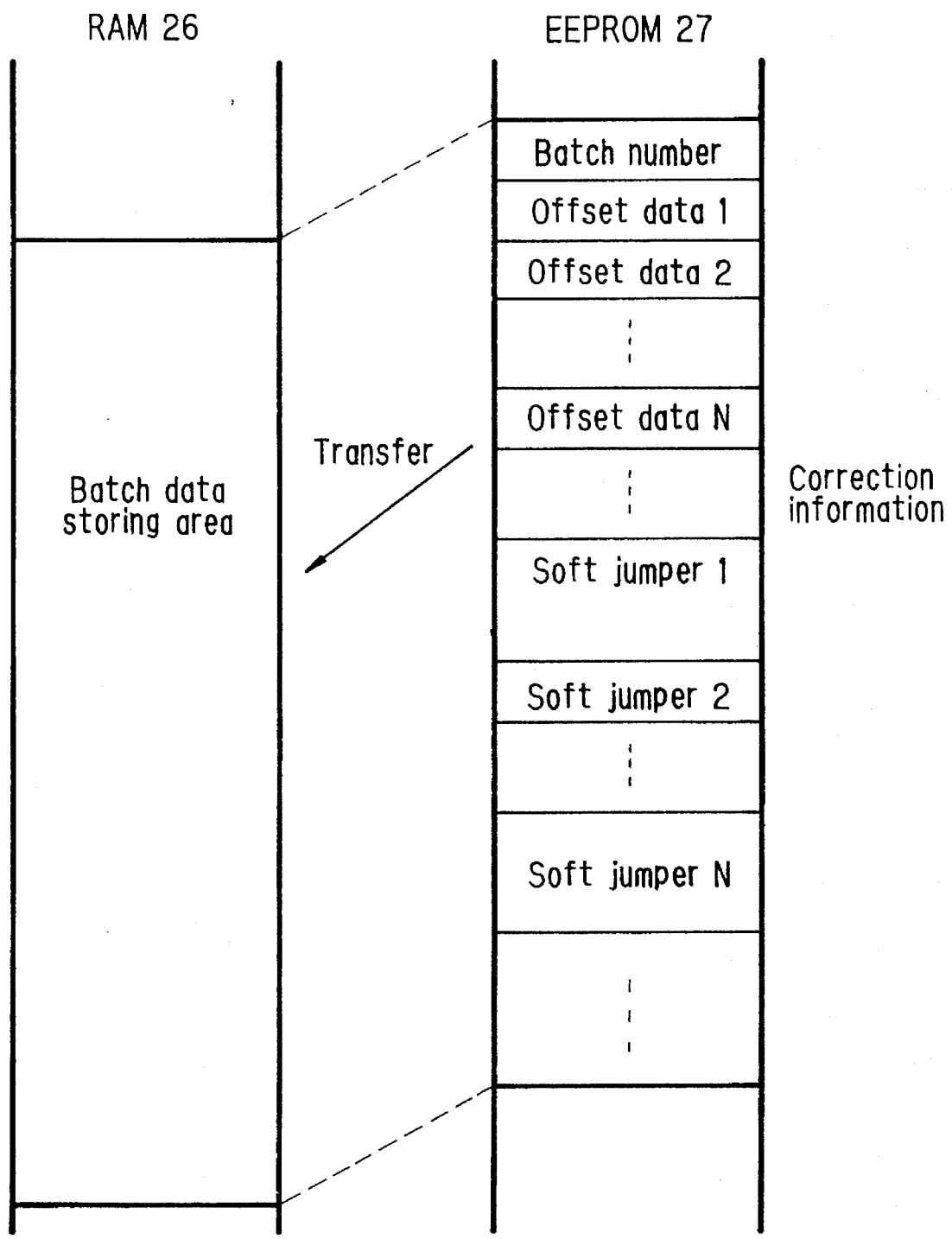
FIG. 3 is a schematic view showing the structure of correction information of the embodiment.

Here, the offset data represents the difference between the top address of the correction information storage area on the EEPROM 27 of FIG. 3 and the top address of an area in which each soft jumper is stored. For example, an offset data 1 represents the difference between the top address of the correction information storage area as described above and the top address of an area in which the soft jumper 1 is stored.

At step ST11 of FIG. 2(a), the top address of each soft jumper on the RAM 26 is calculated by adding the value of the corresponding offset data and the top address of the correction information storage area on the RAM 26. These calculated top addresses are stored into a table in the RAM 26.

The table call command used in this invention is composed of one byte, and a table call command is prepared beforehand in correspondence with each bug. Every time a bug correction is executed, a table call command corresponding to a bug correction to be next executed is stored into the correction data register 31 (the function of the table call command will be described later).

Likewise, the correction address to be stored into the correction address register 31 is rewritten to a correction address corresponding to a bug correction to be next executed every time a bug correction is executed.

Upon termination of the operation at the ST11 as described above, the electronic device 1 starts a desired control of the electronic equipment.

As shown in FIG. 2(b), during the execution of the control of the electronic equipment, the correction address stored in the correction address register 31 is compared with an execution address of the CPU 14 supplied from the address bus 16 in the comparator 22 as shown in FIG. 1 (ST12). Before the execution address of the CPU 14 reaches a part of a program in ROM 15 which contains a bug and which is to be altered (that is, before the execution address reaches the correction address), a movable terminal of the switch 33 remains connected to a fixed terminal of the ROM side by a signal output from the comparator 22. In this way, the normal program of the ROM 15 is successively read out and executed (ST13 and ST14).

When the execution of the program by the CPU 14 proceeds and the execution address reaches the correction address, a coincidence signal 5 occurs at the output side of the comparator 22. The coincidence signal 5 is supplied to the switch 33, so that the movable terminal of the switch 33 is switched and connected to the fixed terminal of the correction data register 32 side (ST15).

Through this switching operation, the CPU 14 is controlled to access the table call command corresponding to the correction data stored in the correction data register 32, in place of the normal program of the ROM 15, thereby performing a subroutine call operation of calling an address stored in a called table. Subsequent to the address of the called destination, a program for performing the bug correction is stored, and the bug correction is executed with this program (ST16 and ST17).

At a final step of the bug correction program, a jump operation is executed to return to an address just subsequent to the corrected portion on the ROM 15. Then the execution of the normal program on the ROM 15 is resumed (ST18).

According to this invention, as, described above, the program to be executed is shifted from the normal program stored in the ROM 15 to the bug correction program using the table call command, and then it is returned from the bug correction program to the normal program by the jump command when the execution of the bug correction program is terminated. Therefores the bug correction program is applicable to a corrected portion having any length in the normal program, and also any length may be adopted for the program if occasion demands, so that high correction capability can be performed for any bug occurring in the normal program of the ROM 15. In this invention, a batch correction program having any size can be installed even in a microcomputer which merely carries out only one-byte replacement as a batch correction and has no command for instructing jumping to any address as a one byte command, by adopting the one-byte table call command and the jump command.

The flow of the bug correction program will be next described in detail.

For execution of the bug correction program, it is first required to perform a common pre-processing operation which is required prior to the execution of an individual soft jumper stored in the RAM 26. That is, pre-processing is performed to start and execute the soft jumper. The bug correction program of this invention comprises a soft jumper start-processing program and a soft jumper.

Figure 4:
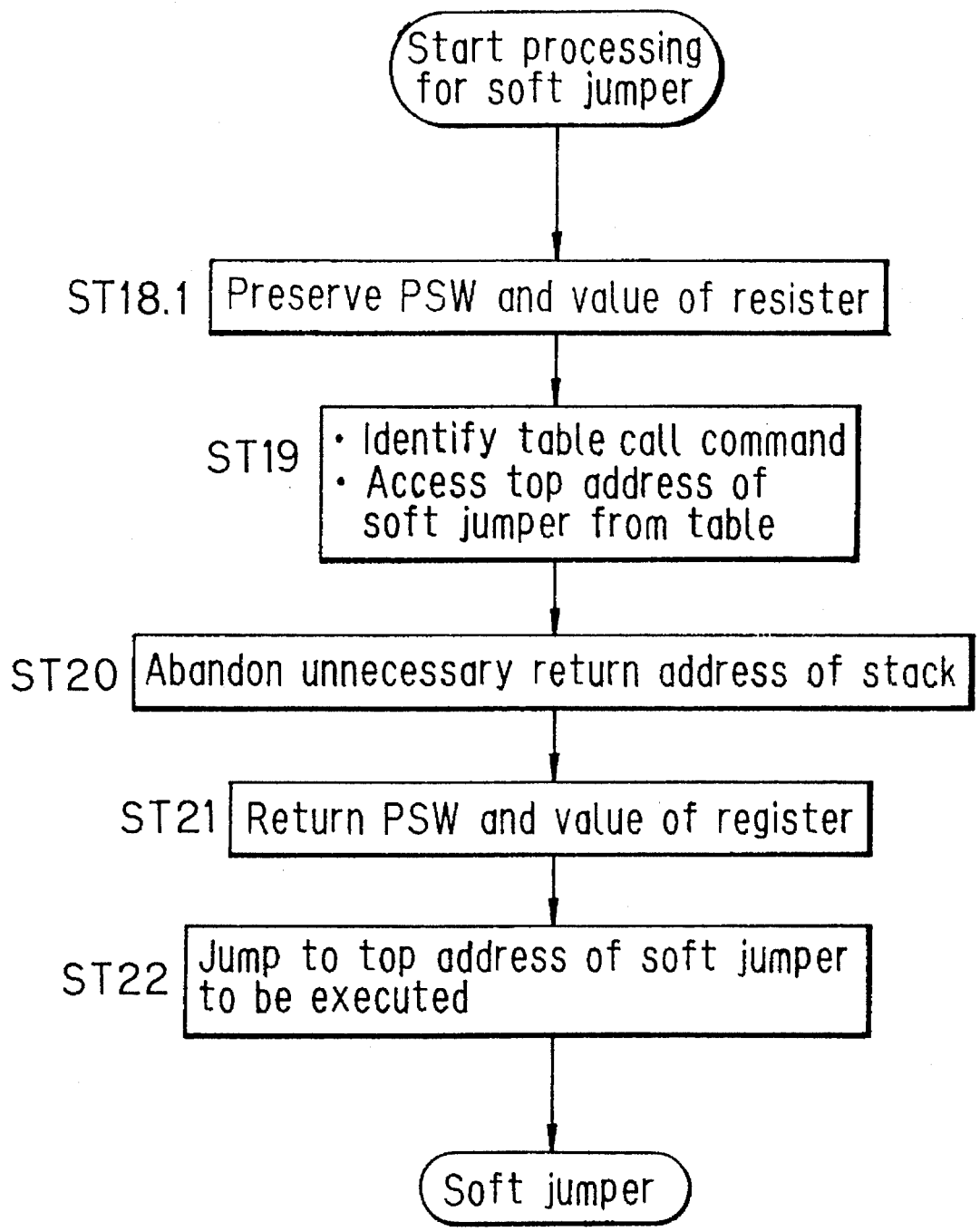
FIG. 4 is a flowchart for a soft jumper start processing in the embodiment.

First, the soft jumper processing program will be described with reference to FIG. 4.

In the electronic device 1 according to this invention, the soft jumper start-processing program is designed to be beforehand stored in a specific area of the ROM 15. Further, since the top address of the specific area of the ROM 15 having the soft jumper start-processing program is stored at an address of the table which is instructed by a table call command stored in the correction data register 32, the CPU 14 of the electronic device 1 will start the execution of the soft jumper start-processing program as described above in response to the table call command.

Upon the start of the soft jumper start-processing program, the value of a program status word PSW and the value of each register in the electronic device 1 are immediately preserved (stored) (ST18.1). These preserved values are returned just before the program jumps to the top address of a soft jumper to be executed on the RAM 25 (ST21).

Through these preserving and returning operations, the electronic device 1 is provided with a function of apparently starting the execution of the soft jumper immediately at the time when the table call command occurs irrespective of variations of the internal status which may occur during the soft jumper start-processing.

Subsequently to the preserving operation of ST18.1 as described above, the number of the soft jumper to be executed is determined by identifying the table call command which serves to start the current soft jumper start-processing. On the basis of the judgment result, the top address of the soft jumper to be executed is read out from the table of the RAM 26 in which the top address of each soft jumper has been previously stored (at step ST11 of FIG. 2(a)).

Subsequently, a return address which is stored in the stack due to the occurrence of the table call command is deleted (scrapped) (ST20). This is required for the following reason.

According to this invention, the program is branched to a bug correction program in response to the table call command, and after the program is executed, the program returns to a normal program. Therefore, the return address which is pushed to the stack at the time when the table call command occurs becomes unnecessary. Accordingly, if the delete processing (i.e., pop processing) as described above is not carried out, only the push operation to the stack would be carried out every time a bug correction program is executed, and thus the storage data amount of the stack would fill up. Therefore, data at the areas other than the stack area in the RAM may be damaged due to overflow from the stack. In order to prevent the damage of the other data, the deleting (scrapping) processing as described above is carried out.

Subsequently, the preserved values are returned (ST21) as described above, and then the program jumps to the top address which has been previously read out at ST19 (ST22) to start the execution of the soft jumper.

Figure 5:
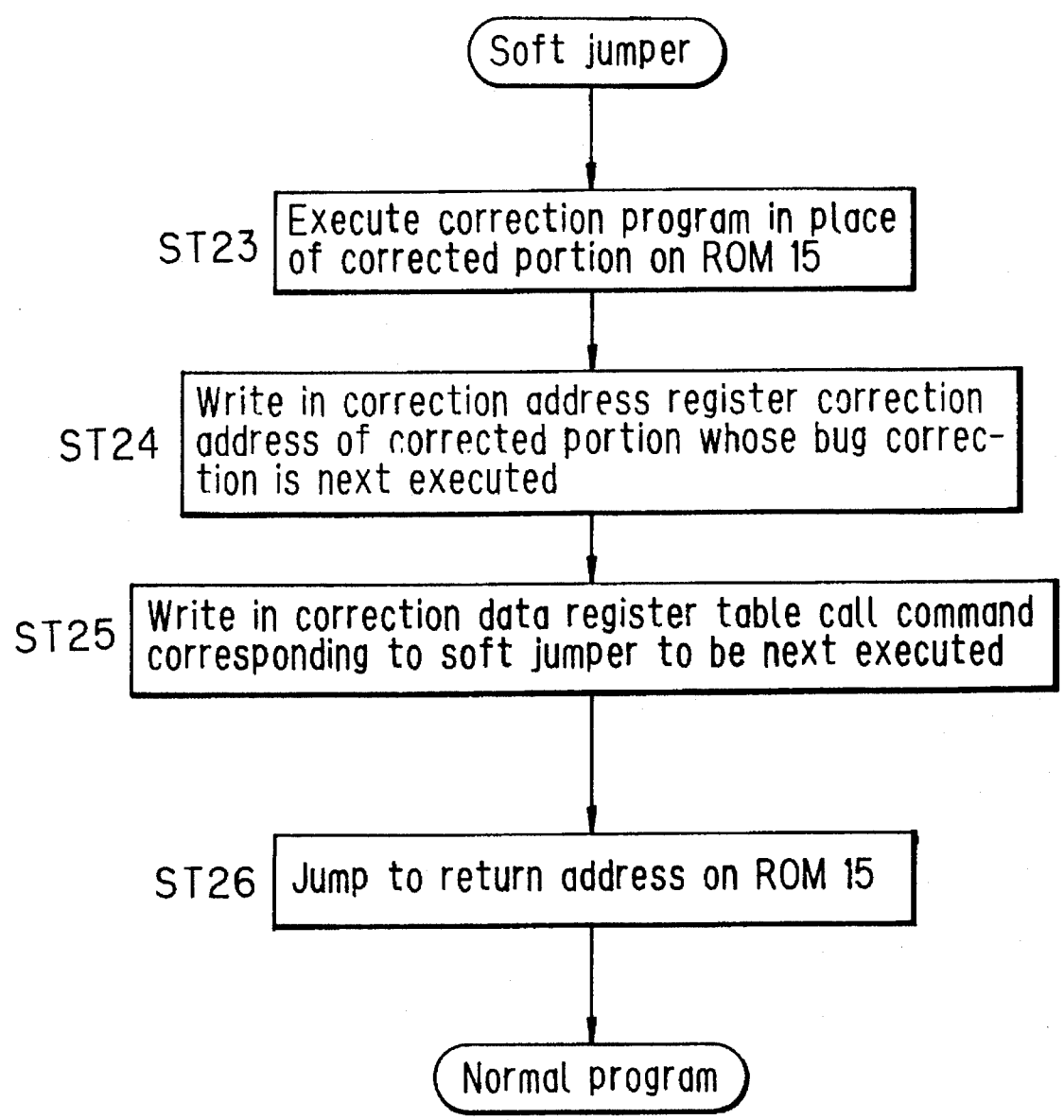
FIG. 5 is a flowchart for a soft jumper in the embodiment.

Next, the details of the steps of the soft jumper will be described with reference to FIG. 5.

In the soft jumper, a correct working program is executed in place of a portion on the ROM 15 (ST23) which requires correction. After this execution, the correction address register stores a correction address for a portion to be next corrected (ST24). In addition, a table call command corresponding to a soft jumper to be next executed is stored in the correction data register (ST25) to prepare for the bug correction to be next executed. This rewriting of data for the correction address register and the correction data register can be omitted when there is only one correction address. Finally, the program jumps to the return address of the ROM 15 (ST26) to resume the normal program.

The process flow of the bug correction program as described above is shown together with the address maps of the ROM 15 and the RAM 26 in FIG. 6. As shown in FIG. 6, after the execution address of the normal program reaches a correction address $X_N$, the program jumps to the execution of the bug correction program, and then returns to the normal program in the ROM 15 again. The process flow of FIG. 6 proceeds in the order of (1), (2), (3) and (4).

This invention relates to the electronic device capable of performing the batch correction as described above, however, this invention is not limited to this embodiment. Various modifications may be made to the above embodiment, and the construction of the above embodiment may be modified. For instance, three illustrative examples of possible modifications are described below.

(1) In place of the arrangement of FIG. 1 where the external storage unit is provided at the outside of the electronic device 1, the storage unit can be provided inside of the electronic device 1.

(2) The calculation of the top address of the soft jumper is performed in the soft jumper start-processing program. That is, the top address of a soft jumper to be executed every time an individual bug correction is executed is calculated in the soft jumper start-processing program and stored in the RAM or the like. Then, at the final step of the soft jumper start-processing, the program jumps on the basis of this top address stored in the RAM or the like.

(3) The deleting (scrapping) processing for the return address which is pushed to the stack due to the occurrence of the table call command is carried out in the soft jumper.

As described above in detail, according to the electronic device of this invention, even when a bug is found or a partial alteration is required after mass-production, such problems can be easily and rapidly solved by merely supplying correction information from an external source to the electronic device, in place of the conventional high-cost countermeasure that an external circuit is added or the electronic device itself is mass-produced again.

Further, even when the storage area of the correction information storing means in the electronic device is relatively small, sufficient correcting information can be stored by adopting the storing method which minimizes the required amount of storage area.

What is claimed is:

1. An electronic device having an integrated structure comprising:

central processing means for accessing stored information and calculation processing;

fixed storage means for storing information;

input means for inputting correction information for correcting a specific part of the information stored in the fixed storage means;

correction information storage means for storing the correction information input from the input means;

change-over means for switching access by the central processing means from an area in which the specific part of the information stored in the fixed storage means is stored, to the correction information storage means;

means for starting the operation of switching access by the central processing means from the fixed storage means to the correction information storage means based on a table call command;

means for returning access by the central processing means from the correction information storage means to the fixed storage means based on a jump command; and means for scrapping return address data stored in a stack, before access by the central processing means is returned from the correction information storage means to the fixed storage means, based on a table call command; and wherein the correction information includes at least batch correction data for correcting the specific part of the information stored in the fixed storage means and a parameter for calculating a storage position of the batch correction data in the correction information storage means.

2. The electronic device as claimed in claim 1, further comprising means for calculating the storage position of the batch correction data in the correction information storage means at a time when the correction information is stored in the correction information storage means.

3. The electronic device as claimed in claim 1, further comprising:

preserving means for preserving at least one of the value of a register and the value of a program status word in the electronic device; and means for returning the value preserved by the preserving means just before a batch correction is started.

4. The electronic device as claimed in claim 1, wherein the input means comprises an EEPROM.

5. The electronic device as claimed in claim 1, wherein the correction information comprises a soft jumper for correcting at least the specific part of the information stored in the fixed storage means.

6. The electronic device as claimed in claim 5, wherein the correction information includes offset data representing the difference between a top address of the correction information storing area of the correction information storage means and the top address of an area in which the soft jumper is stored.

7. The electronic device as claimed in claim 1, further comprising means for calculating the storage position of the batch correction data in the correction information storage means when correction for the specific part is executed.

* * * * *